(12) United States Patent
Zhang et al.

(10) Patent No.: US 9,023,966 B2
(45) Date of Patent: May 5, 2015

(54) FUNCTIONAL POLYMER FOR ENHANCED OIL RECOVERY

(76) Inventors: Rui Zhang, Shanghai (CN); Yongchun Tang, Walnut, CA (US)

( * ) Notice: Subject to any disclaimer, the term of this patent is extended or adjusted under 35 U.S.C. 154(b) by 375 days.

(21) Appl. No.: 12/429,137

(22) Filed: Apr. 23, 2009

(65) Prior Publication Data

US 2010/0029880 A1 Feb. 4, 2010

Related U.S. Application Data

(63) Continuation-in-part of application No. PCT/US2007/082307, filed on Oct. 23, 2007.

(60) Provisional application No. 60/853,468, filed on Oct. 23, 2006.

(51) Int. Cl.
| | |
|---|---|
| *C08F 228/02* | (2006.01) |
| *C08F 214/16* | (2006.01) |
| *C08F 226/02* | (2006.01) |
| *C09K 8/584* | (2006.01) |

(52) U.S. Cl.
CPC ..................................... *C09K 8/584* (2013.01)

(58) Field of Classification Search
USPC ............. 526/287, 303.1, 307.1, 307.2, 307.3, 526/307.4, 307.6, 307.7
See application file for complete search history.

(56) References Cited

U.S. PATENT DOCUMENTS

| 4,524,175 | A | * | 6/1985 | Stanley, Jr. ...................... 524/831 |
| 4,694,058 | A | * | 9/1987 | Siano et al. ................ 526/307.2 |
| 4,702,319 | A | * | 10/1987 | Bock et al. .................... 166/275 |
| 4,709,759 | A | * | 12/1987 | Bock et al. .................... 166/275 |
| 4,792,593 | A | * | 12/1988 | Schulz et al. ................ 526/240 |
| 4,814,096 | A | * | 3/1989 | Evani ........................... 507/224 |

FOREIGN PATENT DOCUMENTS

CN 1178802 A 4/1998

OTHER PUBLICATIONS

Feng et al. Polymer 43 (2002) 2055-2064.*
Taylor et al. Journal of Petroleum Science and Engineering 19 (1998) 265-280.*

* cited by examiner

*Primary Examiner* — Vu A Nguyen
(74) *Attorney, Agent, or Firm* — Jun He Law Office P.C.; James J. Zhu

(57) ABSTRACT

The present invention relates compositions and methods for enhanced oil recovery. The method is directed to employing a water-soluble The present invention relates compositions and methods for enhanced oil recovery (EOR). The method is directed to employing a water-soluble functional polymeric surfactant (FPS), with a medium IFT value, preferably ranged from about 0.1 to about 15 dyne/cm between water phase containing polymeric surfactant and hydrocarbon phase, for recovery of hydrocarbons from subterranean formations. The FPS solution demonstrates a strong interaction with oil and the great potential to increase both volumetric sweep efficiency and microscopic displacement efficiency in EOR.

8 Claims, No Drawings

FUNCTIONAL POLYMER FOR ENHANCED OIL RECOVERY

RELATED APPLICATIONS

The present application is a Continuation-in-Part of International Application Ser. No. PCT/US2007/082307, filed Oct. 23, 2007, which claims the priority to U.S. Provisional Application No. 60/853,468, filed Oct. 23, 2006, both of which are hereby incorporated by reference in their entirety including drawings as fully set forth herein.

FIELD OF THE INVENTION

The present invention relates to the field of oil production. Particularly, the present invention relates to enhanced oil recovery by using functional surfactant polymers.

BACKGROUND OF THE INVENTION

Primary recovery of hydrocarbon (e.g., oil) from a hydrocarbon-bearing (e.g., oil-bearing) reservoirs relies upon the use of natural energy present in the reservoir as the main source of energy for the displacement of oil to production wells. Usually, however, this process merely recovers a minor portion of the original oil in place (OOIP). Thus, a variety of supplemental recovery techniques have been employed in order to increase the recovery of oil from subterranean reservoirs.

The viability of an oil recovery displacement process depends on two important factors: volumetric sweep efficiency and microscopic displacement efficiency. Enhanced oil recovery (EOR) processes are usually employed to involve the injection of a fluid or fluid of some type into a reservoir. The injected fluids and injection processes supplement the natural energy present in the reservoir to displace oil to a producing well. In addition, the injected fluids interact with the reservoir rock and oil system to create conditions favorable for oil recovery. The mobility control process and chemical process are two commonly used EOR processes.

The widely applied mobility control process is the polymer flood. In a typical application, the polymer solutions are designed to develop a favorable mobility ratio between the injected polymer solution and the oil/water bank being displacement ahead of the polymer. The purpose is to develop a uniform volumetric sweep of the reservoir, both vertically and a really, in order to prevent water from fingering by the oil and moving by the shortest path to the production well. A number of polymer projects have been implemented since 1960's. However, the mobility control process alone does not employ the microscopic displacement efficiency and suffers the low recovery efficiency, thus the incremental oil recovery is limited, usually under 10% OOIP of oil recovery. Manning et al. analyzed statistical data of the fieldwide projects, the median recovery of oil was 2.91% OOIP (1983, Report DOE/ET/10327-19). Schurz et al. summarized results from 99 projects initiated during 1980-1989 and the projected median incremental oil recovery ranges between 3.7% and 4.8% (1989, NMT 890029, New Mexico Tech Centennial Symposium). Gogarty et al discussed about much of incremental recovery by polymer flooding is the result of accelerated oil production before the economic limit is reached (1967, SPE 1566-A, pp. 149-160).

Chemical processes involve the injection of specific liquid chemicals that efficiently displace oil because of the phase behavior properties, which result in decreasing the interfacial tension (IFT) between the displacing liquid and oil. The surfactant/polymer process has been demonstrated to have the potential in application in enhanced oil recovery. In this process, the primary surfactant slug, a micellar solution, is followed by a mobility buffer, a solution that contains polymer which is often graded in concentration, becoming more dilute in polymer as more of the solution is injected. The recovery efficiency primarily uses a displacing fluid that has an ultra low IFT with the displaced oil. Green et al. specifically disclosed that the IFT of displacing fluid must be reduced to ultra low, about $10^{-3}$ dyne/cm, before a large reduction in the waterflood residue oil saturation is achieved (1998, ISBN 1-55563-077-4, SPE Textbook Series Vol. 6, pp. 35). There are drawbacks, however. The chemical solutions for generating ultra low IFT, which need to contain surfactant, cosurfactant, and sometimes oil, electrolytes, and alkaline, are usually complicated and expensive, and may suffer chromatographic separation during the EOR operation.

Since the pioneering concept of polymeric soap published by Strauss et al. in 1951, there has been a vast amount of literature published on the polymerization of or in organized amphiphilic assemblies. To some extent, polymeric surfactants serve all the same functions as low molecular weight surfactants. Because of their high molecular weight and complex structures, however, they have some unique characteristics. For example, formation of monomolecular micelles in the dilute solution, various shapes of micelles at different concentrations, etc. Applications such as emulsion stabilizers in submicronic colloidal systems also have been published. Polymeric surfactants are a very attractive class of compounds since the presence of macromolecular chains at the surface of colloidal particles offer significant advantages. This combination of rheological features (e.g. thickening properties) and unique phase behavior properties has broad potential applications in super absorbency, latex paints, hydraulic fluids, flocculation, protein separation, controlled drug release, and biological and medical devices. However, there is only very few literature which explored the use of polymeric surfactant for enhance oil recovery.

The common theory of chemical processes believes that the microscopic displacement efficiency largely determines the residual oil saturation remaining in the reservoir rock at the end of the process, which is one of the key criteria in evaluating the success or failure of a chemical EOR process. Capillary and viscous forces govern phase trapping and mobilization of fluids in porous media and thus microscopic displacement efficiency. Green et al. studied the capillary number $N_{ca}=(v\mu_w)/\delta_{ow}$, wherein the $N_{ca}$=capillary number, v=interstitial velocity, $\mu_w$=displacing phase viscosity, and $\delta_{ow}$=the IFT between the displacing and displaced phases (1998, ISBN 1-55563-077-4, SPE Textbook Series Vol. 6, pp. 22). It has been widely accepted in the art that the residue oil saturation cannot be largely reduced unless the $\delta_{ow}$ becomes ultra low at $10^{-3}$ dyne/cm level. Therefore, attempts of design polymeric surfactant have so far be concentrated on selecting the polymeric surfactant or preparing the polymer surfactant-containing solution with co-surfactant or other additives to generate low or ultra low IFT value between the oil and water phase.

For example, in early 80s, Chen et al. (1981, U.S. Pat. No. 4,284,517, 1982, U.S. Pat. No. 4,317,893) disclosed a method for the recovery of oil from a subterranean oil reservoir penetrated by spaced injection and production systems in which an aqueous fluid containing polymeric surfactant is introduced into reservoir via injection system to displace oil to said production system. Chen et al. specifically emphasized that the interfacial tension between oil and water should be less than 0.1 dyne/cm (e.g., a preferred the oil-water IFT having a value of 0.005 dyne/cm or less) in order to reach an optimum microscopic displacement efficiency.

Cao et al. (2002, European Polymer Journal, 38 (7), pp. 1457-1463) identified a novel family of polymeric surfactants which might have potential for enhance oil recovery. The novel series of polymeric surfactants is based on carboxy methyl cellulose and alkyl poly (etheroxy) acrylate. The IFT properties of this kind of polymeric surfactant change little with NaCl added. The formed micelles shrink, their size becomes smaller. Alcohols cause the IFT to decrease a little because a small amount of free chains present in solution. Under the influence of added alkali, the IFT of the polymeric surfactants, in aqueous solution, decreases to the level of less than $10^{-2}$ dyne/cm.

Influenced by the conventional wisdom of employing ultra low IFT displacing fluid in the chemical processes, even though the hydrophically modified water-soluble copolymers have recently attracted a great deal of interest, the attempt of using polymeric surfactant for the EOR application is mainly aimed at how to generate efficient and stable viscosity to improve the sweep efficiency as mobility controllers. McCormick et al conducted a coordinated, fundamental research program in lab with the ultimate goal of developing "smart" multi-functional polymers that can respond in situ to stimuli and result in significantly improved sweep efficiency in EOR processes (2004, 2005, DOE Report, Award Number DE-FC26-03NT15407). McCormick et al. merely investigated the improvement of sweep microscopic displacement efficiency and phase behavior of polymeric surfactants compared to polymers, but did not disclose the use of polymeric surfactants with oil-water with IFT values more than of 0.1 dyne/cm in EOR.

Contrary to the conventional wisdom, it is unexpectedly discovered that the polymeric surfactants with medium range oil-water IFT value, e.g., no less than about 0.1 dyne/cm (e.g., preferably ranged from about 0.1 to about 15 dyne/cm) have both volumetric sweep efficiency and microscopic displacement efficiency and can be used for hydrocarbon recovery from subterranean formation.

SUMMARY OF THE INVENTION

One aspect of the present invention relates to a method for recovering hydrocarbon from a hydrocarbon-bearing subterranean reservoir or formation by injecting into the reservoir or formation a displacing solution containing a functional polymeric surfactant which has an oil-water IFT value of no less than about 0.1 dyne/cm, preferably about 0.1 to about 15 dyne/cm.

Another aspect of present invention relates to functional polymeric surfactants which have a partially hydrolyzed polyacrylamide backbone and a repeating monomer unit having the following formula, the FPS having an oil-water IFT value of no less than about 0.1 dyne/cm, preferably about 0.1 to about 15 dyne/cm:

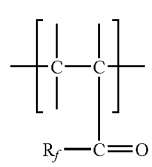

(Formula (1))

$R_f$—$NH_2$, —ONa, —$OR_L$, —$NHR_L$, —$R_LSO_3Na$, -$(EO)_a(PO)_bR_L$, quaternary ammonium surfactant moiety, bis-ammonium Gemini surfactant moiety, —$R_LSH$, and the like, PO represents —CH2-CH(CH3)-O—, EO represents —CH2-CH2-O—, wherein $R_L$ is a hydrophobic moiety (e.g., an alkyl, phenyl or the derivatives thereof), and a+b is an integer from 6 to 30.

Another aspect of present invention relates to functional polymeric surfactants which comprise a first repeating monomer unit and a second repeating monomer unit having the following formula, the FPS having an oil-water IFT value of no less than about 0.1 dyne/cm, preferably about 0.1 to about 15 dyne/cm:

a first repeating monomer unit with a hydrophobic moiety

(Formula (2))

a second repeating monomer unit with a hydrophilic moiety

(Formula (3))

wherein $R_1$ and $R_2$ are hydrogen or $C_1$-$C_4$ alkyl respectively.

Another aspect of the present invention relates to functional polymeric surfactants comprising three repeating monomer units (a first repeating unit, a second repeating unit, and a third repeating unit) having the following formula, the FPS having an oil-water IFT value of no less than about 0.1 dyne/cm, preferably about 0.1 to about 15 dyne/cm:

a first repeating monomer unit with a hydrophobic moiety

(Formula (2))

a second repeating monomer unit with a hydrophilic moiety

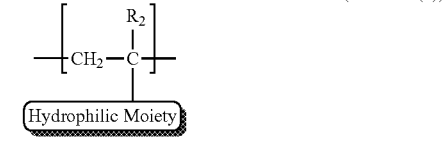

(Formula (3))

a third repeating monomer unit

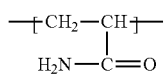

$$\text{—}[CH_2\text{—}CH]\text{—} \quad \text{(Formula (4))}$$
$$\quad\quad\quad |$$
$$\quad H_2N\text{—}C\text{=}O$$

wherein $R_1$ and $R_2$ are hydrogen or $C_1$-$C_4$ alkyl respectively.

Another aspect of the present invention relates to functional polymeric surfactants comprising a polymeric reaction product of the following three repeating monomers, the FPS having an oil-water IFT value of no less than about 0.1 dyne/cm, preferably about 0.1 to about 15 dyne/cm:

a first repeating monomer:

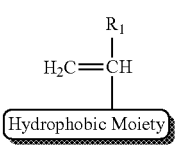

$$\quad\quad R_1 \quad \text{(Formula (5))}$$
$$\quad\quad |$$
$$H_2C\text{=}CH$$
$$\quad\quad |$$
$$\text{Hydrophobic Moiety}$$

a second repeating monomer:

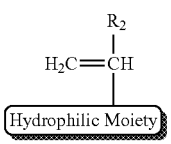

$$\quad\quad R_2 \quad \text{(Formula (6))}$$
$$\quad\quad |$$
$$H_2C\text{=}CH$$
$$\quad\quad |$$
$$\text{Hydrophilic Moiety}$$

a third repeating monomer:

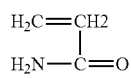

$$H_2C\text{=}CH2 \quad \text{(Formula (7))}$$
$$\quad\quad |$$
$$H_2N\text{—}C\text{=}O$$

wherein $R_1$ and $R_2$ are hydrogen or $C_1$-$C_4$ alkyl respectively.

DETAILED DESCRIPTION OF THE INVENTION

To facilitate the understanding of this invention, a number of terms are defined below. Terms defined herein have meaning as commonly understood by a person of ordinary skill in the area relevant to the present invention. Terms such as "a", "an", "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "reservoir condition" refers to the temperature, pressure, salinity, and other conditions that are commonly found in subterranean formation.

As used herein, the term "polymer" refers to a molecule of molecular weight of at least 1000 grams/mole, the structure of which essentially includes the multiple repetitions of units derived, actually or conceptually, from molecules of low relative molecular mass.

As used herein, the term "copolymer" or "heteropolymer" refers to a polymer derived from two or more monomeric species, as opposed to a homopolymer where only one monomer species is used.

As used herein, the term "polymeric" refers to including a polymer.

As used herein, the term "surfactant" refers to a surface-active material.

As used herein, the term "unit" refers to the moiety or building block in the polymer molecule. A unit in a polymer is covalently linked to another unit of the same structure or of a different structure.

As used herein, the term of "polymeric surfactant" refers to any polymer with the ability as a mobility control polymer but also has ability to form emulsion.

As used herein, the terms of "functional polymeric surfactant" or "FPS" refers to a polymeric surfactant, with oil-water IFT in the range from about 0.1 to about 15 dyne/cm (e.g., about 0.1 to about 12.5 dyne/cm, about 0.1 to about 10 dyne/cm), that can provide both viscosity for mobility control and the ability to form "Emulsion" between oil and water under reservoir conditions, and should be a candidate for EOR chemical process.

As used herein, the term of "mobility control" refers to the solution viscosity of a polymeric surfactant is greater than water, most of time; the viscosity is equal or greater than the viscosity of the oil need to be recovered under reservoir condition.

As used herein, the term "emulsion" refers to heterogeneous systems of an oil and water phase, include micellar, microemulsion, miscible phase, thermodynamic instable emulsion, double emulsion, and multiple emulsions.

As used herein, the term "interaction" refers to the interaction between the polymeric surfactant solution and oil with the tendency to form emulsion.

As used herein, the term "enhanced oil recovery" or "EOR" refers to the process which usually involves the injection of a fluid or fluid of some type into a subterranean reservoir or formation. The injected fluids and injection processes supplement the natural energy present in the reservoir to displace oil to a producing well. In addition, the injected fluids interact with the reservoir rock and oil system to create conditions favorable for oil recovery displacement. After the waterflood to irreducible oil saturation, the typical EOR process can yield 5-25% of Original Oil In Place (OOIP) as the incremental oil recovery. Moreover, the EOR process can also been implemented wherein the waterflood has not yet reached the irreducible oil saturation.

As used herein, the term "Subterranean Formation" or "Subterranean Reservoir" refers to a place where the crude hydrocarbons found in reservoirs forms in the Earth's crust. It exists anywhere from 1,000 to 30,000 ft below the surface and has a variety of shapes, sizes and ages. The subterranean formation may have been exposed to water injection, polymer flood or chemical processes.

As used herein, the term "displacing fluid" or "displacing solution" refers to an aqueous fluid used for enhanced oil recovery in subterranean formation.

Conventional wisdom believes the emulsion is contributed by low IFT and thus leads to the searching of ultra low IFT ($10^{-4}$ to $10^{-2}$ dyne/cm between the displacing fluid and oil) to form emulsion with oil for efficient micellar/polymer flood. However, the present invention demonstrates the unexpected testing results, suggesting that the polymeric surfactants with medium oil-water IFT (0.1 dyne/cm or higher) can also efficiently emulsify oil and be used for EOR chemical processes based on the coreflood tests and field tests Without being bound to any theory, since the functional polymeric surfactants according to the present invention can not only yield viscosity as a mobility controller, but also efficiently emulsify oil, the requirement of low or ultra low IFT as commonly recognized in the art may not be applicable to the functional polymeric surfactants. The use of FPS with only small IFT reduction, as single primary agent for EOR chemical process, may provide a game change technology for future enhance oil recovery since one can design hundreds of new FPS for cost effective EOR process based on the disclosure in the present invention.

Due to its unexpected feature, the FPS for the EOR chemical processes described in present invention disclosure not only serves as a polymer for mobility control but also a pseudo surfactant which can form emulsions under reservoir conditions. The FPS can achieve both volumetric sweep efficiency and microscopic displacement efficiency. The key features of FPS in the water flood for EOR will have following properties: (1) The FPS water solution will increase the apparent viscosity to lower the water mobility; (2) FPS may be able homogenize permeability by selective adsorption and mechanical entrapment of FPS on the rock; (3) FPS may also have certain degree of viscoelaticity effects, and (4) FPS is a surface active agent which lowers oil-water IFT.

Accordingly, one aspect of the present invention is directed to a new and improved oil recovery process wherein a displacing fluid comprising a functional polymeric surfactant with medium oil-water IFT value is injected to hydrocarbon-bearing subterranean formation.

In one embodiment, the IFT value is about 0.1 to about 15 dyne/cm, preferably, about 0.1 to about 10 dyne/cm, more preferably about 0.5 to about 10 dyne/cm. The IFT value can be measured by a method known in the art. In the present invention, the IFT value is measured as follows. An oil phase (e.g., n-heptane) and an aqueous phase (e.g., the FPS solution in 3% NaCl) were mixed at 86 F using a spinning drop interfacial tensiometer: The interfacial tension between the two phases was measured as a function of time, usually for 2 hours. The measurement was recorded if the values vary within 1-2% variation for a period of 20 minutes.

In another embodiment, the concentration of the functional polymeric surfactant in the displacing solution or fluid ranges from about 20 ppm to about 10,000 ppm, from about 100 ppm to about 6000 ppm, from 200 ppm to about 3000 ppm, from about 300 ppm to about 1500 ppm.

In another embodiment, the subterranean formation or reservoir contain remaining hydrocarbon (e.g. oil) after the displacement of original oil to producing wells through natural energy. In addition, the subterranean formation may have been water-flooded and reached the irreducible water saturation. Further, the subterranean formation may have been subject to a chemical process and deemed as unrecoverable.

In another embodiment, the displacing solution is delivered to the subterranean formation through an injection system (e.g., an injection well) and the hydrocarbon (e.g., oil) is recovered through a production system (e.g., a production well). In certain embodiment, the injection well is the same as the production well. For example, in the "huff and puff" method, a FPS solution is injected via a well to the subterranean hydrocarbon-bearing formation. The injection well is then shut-in for a soaking period, after which it is placed for production.

In another embodiment, the enhance oil recovery method using the FPS renders typically about 5-30% OOIP, preferably about 10-30% OOIP, preferably about 15-30% OOIP, more preferably 15-25% OOIP.

Another aspect of this invention is directed to a functional polymeric surfactant composition which comprises a variety of different synthetically produced carbon-based and siloxane-based polymeric surfactants, wherein the polymeric surfactant includes at least one hydrophilic monomer unit and at least one hydrophobic monomer unit, with the oil-water IFT value greater than 0.1 dyne/cm. The preferred polymeric surfactants include the functionalized polyacrylamide and the derivatives thereof.

Another aspect of present invention relates to functional polymeric surfactants which have a partially hydrolyzed polyacrylamide backbone and a repeating monomer unit having the following formula, the FPS having an oil-water IFT value of no less than about 0.1 dyne/cm, preferably about 0.1 to about 15 dyne/cm:

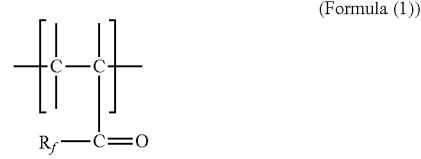

(Formula (1))

$R_f$=—$NH_2$, —ONa, —$OR_L$, —$NHR_L$, —$R_LSO_3Na$, -$(EO)_a(PO)_bR_L$, quaternary ammonium surfactant moiety, bis-ammonium Gemini surfactant moiety, —$R_LSH$, and the like, PO represents —CH2-CH(CH3)-O—, EO represents —CH2-CH2-O—, wherein $R_L$ is a hydrophobic moiety (e.g., an alkyl, phenyl or the derivatives thereof), and a+b is integer from 6 to 30.

Another aspect of present invention relates to functional polymeric surfactants which comprise a first repeating monomer unit and a second repeating monomer unit having the following formula, the FPS having an oil-water IFT value of no less than about 0.1 dyne/cm, preferably about 0.1 to about 15 dyne/cm:

a first repeating monomer unit with a hydrophobic moiety

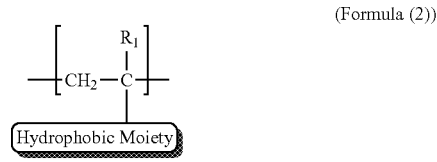

(Formula (2))

a second repeating monomer unit with a hydrophilic moiety

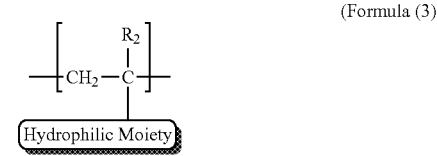

(Formula (3))

wherein $R_1$ and $R_2$ are hydrogen or $C_1$-$C_4$ alkyl respectively.

Another aspect of the present invention relates to functional polymeric surfactants comprising three repeating monomer units (a first repeating unit, a second repeating unit, and a third repeating unit) having the following formula, the FPS having an oil-water IFT value of no less than about 0.1 dyne/cm, preferably about 0.1 to about 15 dyne/cm:

a first repeating monomer unit with a hydrophobic moiety

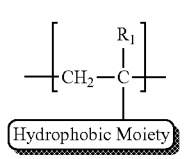
(Formula (2))

a second repeating monomer unit with a hydrophilic moiety

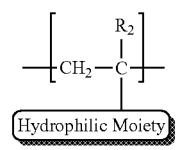
(Formula (3))

a third repeating monomer unit

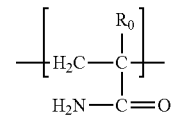
(Formula (4))

wherein $R_0$, $R_1$, and $R_2$ are hydrogen (H) or $C_1$-$C_4$ alkyl respectively. When $R_0$ is H, the third repeating monomer unit is

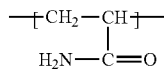

Another aspect of the present invention relates to functional polymeric surfactants comprising a polymeric reaction product of the following three repeating monomers, the FPS having an oil-water IFT value of no less than about 0.1 dyne/cm, preferably about 0.1 to about 15 dyne/cm:

a first repeating hydrophobic monomer:

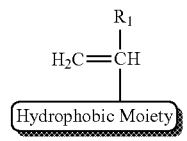
(Formula (5))

a second repeating hydrophilic monomer:

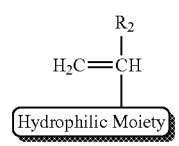
(Formula (6))

a third repeating monomer:

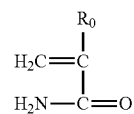
(Formula (7))

wherein $R_0$, $R_1$, and $R_2$ are hydrogen (H) or $C_1$-$C_4$ alkyl respectively. When $R_0$ is H, the third repeating monomer is $$H_2C=CH2$$
$$|$$
$$H_2N-C=O$$

In another embodiment, the hydrophobic moiety is anionic, cationic, nonionic, zwitterionic, betaine, or amphoteric ion pair. In particular, the nonionic moiety is [—COO-alkyl], [—CO—N($X_1$)($X_2$)], -alkyl, -phenyl, or the derivatives thereof, wherein $X_1$=$C_3$-$C_{30}$ alkyl; $C_1$-$C_3$ alkyl substituted by 1-3 phenyl, phenyl or $C_1$-$C_6$ cycloalkyl and $X_2$=H or $C_3$-$C_{10}$ alkyl. The cationic moiety is alkyl group-containing, phenyl group-containing quaternary ammonium salts, or derivatives thereof (salt is selected from the group consisting —CO—$CH_2$-quaternary ammonium-alkyl group, —CO—NH-quaternary ammonium-alkyl group, bis-ammonium Gemini surfactants, and derivatives thereof).

In another embodiment, the hydrophilic moiety is anionic, cationic, nonionic, zwitterionic, betaine, or amphoteric ion pair. In particular, the nonionic moiety is [—COO-(EO)n-alkyl group], [—COO-(EO)c-fluoroalkyl group], or the derivatives thereof, wherein n is an integer from 6-30, c is an integer from 6-30 and EO represents —CH2-CH2-O—. The anionic moiety is an organic acid salt (e.g., acryl acid, methacrylic acid, maleic acid, itaconic acid, acrylamido methylpropane sulfonic acid, vinylphosphonic acid, styrene sulfonic acid, or derivatives thereof).

In another embodiment, the hydrophobic monomer is selected from the following:

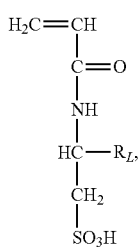
(Formula (8))

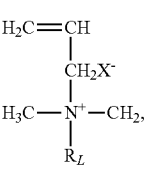
(Formula (9))

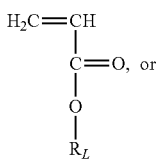 (Formula (10))

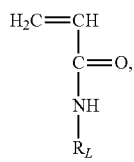 (Formula (11))

wherein $R_L$ is a hydrophobic moiety (e.g., an alkyl, phenyl or the derivatives thereof); and $X^-$ is a $Cl^-$ or $Br^-$.

In another embodiment, the hydrophobic monomer is selected from the following:

$$CH_2\!=\!CH\!-\!CO\!-\!NH\!-\!CH(CH_2\!-\!SO_3Na)((CH_2)_n\!-\!CH_3), \quad \text{(Formula (12))}$$

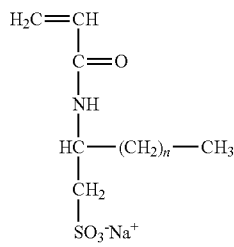

$$CH_2\!=\!CH\!-\!CH_2\!-\!N^+(CH_3)_2\!-\!(CH_2)_n\!-\!CH_3 \cdot X^-, \quad \text{(Formula (13))}$$

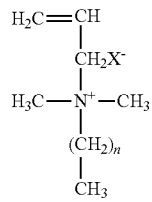

$$CH_2\!=\!CH\!-\!CO\!-\!NH\!-\!(CH_2)_n\!-\!N^+(CH_3)_2\!-\!(CH_2)_n\!-\!CH_3 \cdot X^-, \quad \text{(Formula (14))}$$

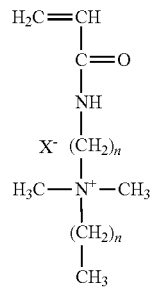

$$CH_2\!=\!CH\!-\!CO\!-\!O\!-\!(CH_2)_n\!-\!CH_3, \text{ or} \quad \text{(Formula (15))}$$

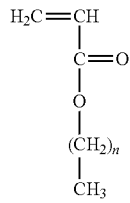

$$CH_2\!=\!CH\!-\!CO\!-\!G; \quad \text{(Formula (16))}$$

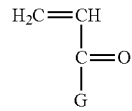

wherein n is an integer from 8 to 20 and $X^-\!=\!Cl^-$, $Br^-$, and G represent a bis-ammonium Gemini surfactant moiety. In particular, G has the following formula:

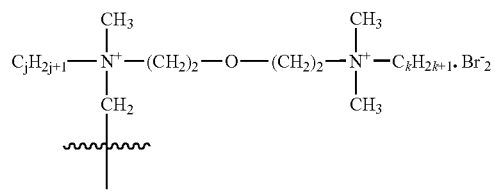 (Formula (17))

wherein (j+k=24, j=12, 13, 14, 16, 18).

In another embodiment, the hydrophilic monomer is selected from the following:

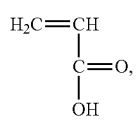 (Formula (18))

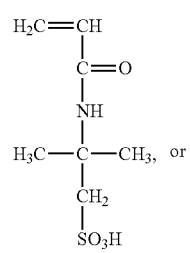 (Formula (19))

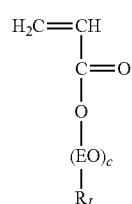 (Formula (20))

wherein $R_L$ is a hydrophobic moiety (e.g., an alkyl, phenyl or the derivatives thereof); EO represents $-\!CH_2\!-\!CH_2\!-\!O\!-\!$, and c is an integer from 8 to 18.

In another embodiment, the hydrophilic monomer is selected from the following:

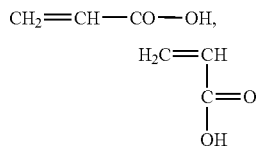
(Formula (21))

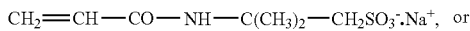
(Formula (22))

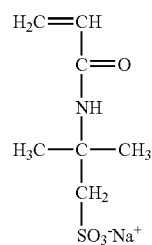
(Formula (23))

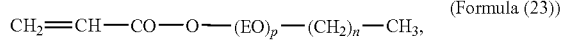

wherein n is an integer from 8 to 20; EO represents —CH$_2$CH$_2$O—, and p is an integer from 6-20.

In another embodiment, the repeating hydrophobic monomer unit in a FPS is selected from the following:

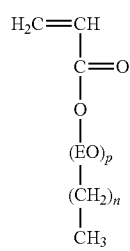
(Formula (24))

(Formula (25))

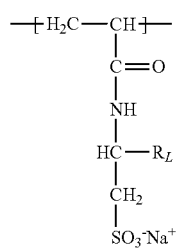

(Formula (26))

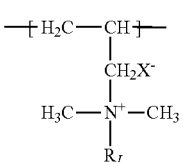
or

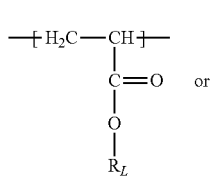

(Formula (27))

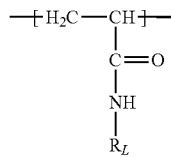

wherein R$_L$ is a hydrophobic moiety (e.g., an alkyl, phenyl or the derivatives thereof); and X$^-$ is a Cl$^-$ or Br$^-$.

In another embodiment, the repeating hydrophobic monomer unit in a FPS is selected from the following (Formula (28))

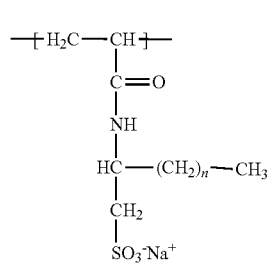

(Formula (29))

(Formula (30))

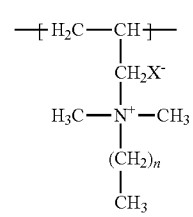

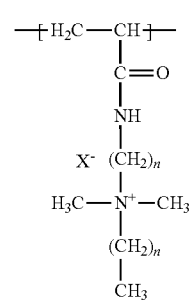

(Formula (31))

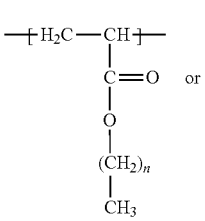
or (Formula (32))

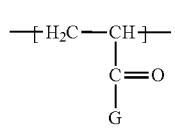

wherein n is an integer from 8 to 20 and X$^-$=Cl$^-$, Br$^-$, and G represents a bis-ammonium Gemini surfactant moiety. In particular, G has a structure as shown in Formula (17).

In another embodiment, the repeating hydrophilic monomer unit in a FPS is selected from the following:

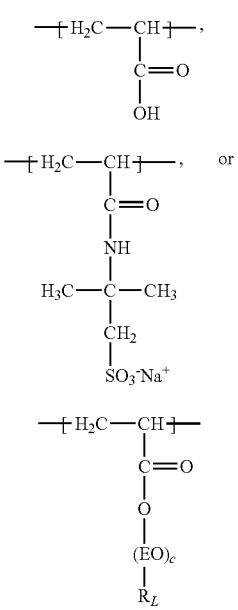

(Formula (33))

(Formula (34))

(Formula (35))

wherein $R_L$ is a hydrophobic moiety (e.g., an alkyl, phenyl or the derivatives thereof); EO represents —$CH_2$—$CH_2$—O—, and c is an integer from 8 to 18.

In another embodiment, the repeating hydrophilic monomer unit is selected from the following:

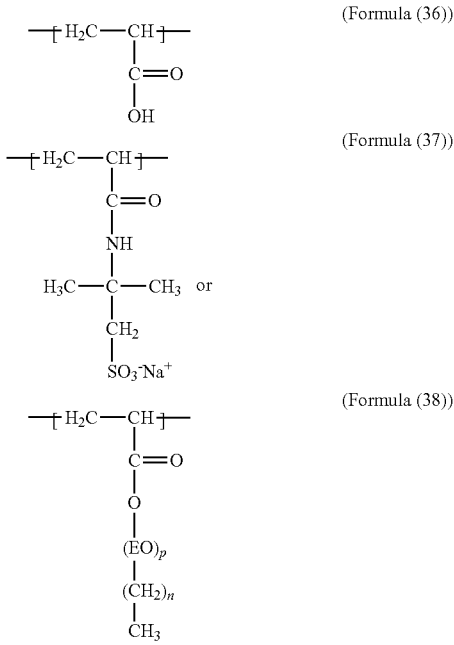

(Formula (36))

(Formula (37))

(Formula (38))

wherein n is an integer from 8 to 20; EO represents —$CH_2CH_2O$—, and p is an integer from 6-20.

In another embodiment, the FPS comprises a variety of different biologically produced polymeric surfactants, wherein the biologically produced or synthesized functional polymeric surfactants have the oil-water IFT value greater than 0.1 dyne/cm. Preferred biological polymeric surfactants include xanthan gum, polysaccharide, and the derivatives thereof.

Besides the direct reaction between polymer and reactants, examples that use primary amine to react with polymers include succinic anhydride moieties (which may have limitation in both yield and low molecular weight, Hill et al. (1993, Macromolecules, 26, pp. 4521-4532). Other researchers have published numerous papers to introduce various copolymerization approaches. The polymeric surfactants, with medium oil-water IFT, can be prepared by the techniques known in the art, including heterogeneous, inverse emulsion, micro-emulsion, precipitation, and micellar free radical copolymerization processes. The exemplary preparations of polymeric surfactants include free radical initiated copolymerization of hydrophilic group-containing monomers (e.g. acrylamide, acrylacid, poly-alkyleneoxy, or alkylsulfonate acrylate, or mixtures thereof) with hydrophobic group-containing monomers (e.g. alkyl acrylamide, phenyl acrylamide, Gemini quaternary ammonium acrylate, or mixtures thereof). Adjusting the concentration and activity of the initiator, the concentration of monomers, the temperature, and the chain-transfer agents can control the molecular weight of the polyacrylate copolymer, which contains two or more monomeric species.

The skilled artisan, after reviewing the instant disclosure, will recognize that various degree of branching, molecular weight and stereo configuration of the polymeric surfactant unit may also be considered along with chemical constituents (e.g. HLB, functional groups, and ionic nature) to determine the application for EOR chemical processes.

Advantages and embodiments of this invention are further illustrated by the following examples, but the particular materials and amounts thereof recited in these examples, as well as other conditions and details, should not be constructed to unduly limit this invention. All parts and percentages are by weight unless otherwise indicated.

EXAMPLES

Example I

The representative examples of FPSs are conducted by the general laboratory methods consist of the following analysis:
1) Phase behavior is analyzed through methods known in the art (See the following references)
  a. Reed, R. L. and Healy, R. N.: "Some Physicochemical Aspects of Microemulsion Flooding." Improved Oil Recovery by Surfactant and Polymer Flooding (D. O. Shah and R. S. Schechter, Eds), Academic Press, New York, N. Y. (1977) 383-437.
  b. Healy, R. N. and Reed, R. L.: "Physicochemical Aspects of Mictoremulsion Flooding," Transactions, AIME, Volume 257 (1974) 491-501.
  c. Dreher, K. D. and Jones, S. C.: "An Approach to the Design of Fluids for Microemulsion Flooding," Solution Chemistry of Surfactants, Volume 2 (K. L. Mittal, Editor), Plenum Publishing Corporation (1979).
  d. Healy, R. N., Reed, R. L., and Stenmark, D. G.: "Multiphase Microemulsion Systems," Transactions, AIME, Volume 261 (1976) 147-160.
  e. Nelson, R. C. and Pope, G. A.: "Phase Relationships in Chemical Flooding," Transactions, AIME, Volume 265 (1978) 325-338.
of emulsion book) of emulsion system. The exemplary systems have hydrocarbon, water and FPS pseudoternary phase.

Typically the lower ratio of the oil phase, the longer the period of miscible displacement which can lead to higher oil recovery, as the oil is emulsified.

2) Core flood experiment was conducted through methods known in the art (See the following references)
f. Holm, L. W. and Knight, R. K.: "Soluble Oil Flooding," Petroleum Engineer (November 1976).
g. Gogarty, W. B.: "Rheological Properties of Pseudoplastic Fluids in Porous Media," Journal of Petroleum Technology (June 1967) 149-160.

Because of the interacting effect of the emulsion with the reservoir rock, phase and physical property studies alone are not sufficient to properly design the emulsion system. The coreflood is a critical to predict the EOR performance in field. Many literatures have been published to show a direct correlation of core flood results with field observation. Green et al. used the coreflood as one of the key design procedures and criteria, by measuring such factors as adsorption, effect of micellar slug size, and effectiveness of mobility control (1998, ISBN 1-55563-077-4, SPE Textbook Series Vol. 6, pp. 285). Gogarty et al. used coreflood to study how to optimize surfactant concentration for field application, and to simulate the displacement, adsorption, mobility control, and scaling behavior in the field (1976, SPE 5559 PA, pp. 93-102).

Example 2

Six synthetic exemplary FPS samples were prepared via free radical initiated copolymerization (Table 1).

Step 1, according to the monomer ratio in the Table 1, the acrylamide, hydrophilic monomers, lipophilic monomers, and sodium carbonate were dissolved with deionized water to form a solution in a 3-neck round bottle flask, followed by sodium formate and ammonium hydroxide. The total mass of all reactants was about 25-30% of total mass of the solution in the flask.

Step 2, the flask was placed in water bath, and was deoxygenated with nitrogen flow for 20 minutes. Under nitrogen protection, the initiator system, including azo initiator (e.g. ABIN), reducer (e.g. sodium bisulfate), and oxidator (e.g., sodium persulfate), was added into the flask. The total mass of the initiator system was 0.01%-0.1% of the total mass of the total mass of all reactants.

Step 3, the flask was allowed to deoxygenate with nitrogen flow for another 10 minutes, and then the flask was sealed. Observed the change of reacting solution and recorded the change of reaction solution temperature to determine the completion of reaction.

Step 4, after the reaction was completed, the water bath temperature was raised to 185 F, and keep the flask in water batch for 4 hours.

Step 5, the resulting gel was then smashed, granulated and dried to obtain samples for further use.

FPS-1a, 1b, 1c each has molecular weight ranged from 5 million to 10 million;
FPS-2a, 2b, 2c each has molecular weight ranged from 0.2 million to 3 million;
H1, H2, and H3 are hydrophilic monomers, and
$H1=[CH_2=CH-CO-OH]$,
$H2=[CH_2=CH-CO-NH-C(CH_3)_2-CH_2SO_3^-Na^+]$,
$H3=[CH_2=CH-CO-O-(EO)_p-(CH_2)_n-CH_3]$;
L1, L2, L3, L4, L5 are hydrophobic monomers, and
$L1=[CH_2=CH-CO-NH-CH(CH_2-SO_3Na)((CH_2)_n-CH_3)]$,
$L2=[CH_2=CH-CH_2-N^+(CH_3)_2-(CH_2)_n-CH_3 . X^-]$,
$L3=[CH_2=CH-CO-NH-(CH_2)_n-N^+(CH_3)_2-(CH_2)_n-CH_3 . X^-]$,
$L4=[CH_2=CH-CO-O-(CH_2)_n-CH_3]$,
$L5=[CH_2=CH-CO-G]$;
n is an integer from 8 to 20;
EO represents $-CH_2CH_2O-$,
p is an integer from 6-20;
$X^-=Cl^-, Br^-$
G represent a bis-ammonium Gemini surfactant moiety, covalent bonding with carbonyl group in the monomer, as

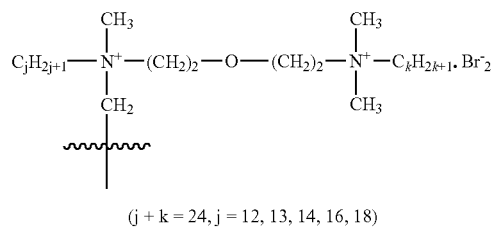

$(j + k = 24, j = 12, 13, 14, 16, 18)$

The IFT measurements reported in the following examples were determined using the following procedure. IFT values for these systems (Oil phase as n-heptane, aqueous phase as 1000 ppm FPS solution in 3% NaCl) were determined at 86 F using a spinning drop interfacial tensiometer. These IFT values were determined in the following way: the interfacial tension of a system was measured as a function of time, usually for 2 hours. If the values for the last 20 minutes agreed to within 1-2%, the 2-hour measurement was reported; if not, the measurements were continued until the 1-2% agreement for a 20-minute period was obtained. All the testing results were listed in Table 2.

The 6 FPS samples (in Table 1) were evaluated for oil-water IFT measurements.

The IFT values of a commercial partially hydrolyzed polyacrylamide previously used in polymer flooding system (MO4000 by Mitsubishi) with an IFT value of 34.33 dyne/cm.

The control reading of n-heptane and 3% NaCl was 44.80 dyne/cm.

TABLE 1

| Monomer | FPS-1a | FPS-1b | FPS-1c | FPS-2a | FPS-2b | FPS-2c |
|---|---|---|---|---|---|---|
| acrylamide | 60-80% | 60-80% | 60-80% | 0-40% | 0-40% | 0-40% |
| H1 | 0-35% | 0-35% | 0-35% | 50-90% | 50-90% | 50-90% |
| H2 | | 1-5% | 1-5% | | | 1-5% |
| H3 | 1-5% | 1-5% | | 1-5% | 1-5% | 1-5% |
| L1 | | | 1-5% | 1-5% | | |
| L2 | | 1-5% | | | 1-5% | |
| L3 | 1-5% | | | 1-5% | | |
| L4 | 0-5% | 0-5% | 0-5% | | | 1-5% |
| L5 | 1-5% | | 1-5% | 1-5% | 1-5% | 1-5% |

TABLE 2

| | FPS-1a | FPS-1b | FPS-1c | FPS-2a | FPS-2b | FPS-2c | MO4000 | control |
|---|---|---|---|---|---|---|---|---|
| IFT | 5.34 | 7.29 | 3.47 | 0.91 | 0.86 | 1.36 | 34.33 | 44.80 |

Example 3

Coreflood tests were carried out at 185 F in epoxy-coated Berea sandstone 12 inch cores (average 487 md air permeability). The dry core was preflushed with 2 pore volumes of brine before it was flooded to an irreducible water saturation with a representative crude oil having a viscosity of about 7.2 cP. The oil saturation was typically from 0.65. The core was then waterflooded with the same brine to irreducible oil saturation (watercut 98%) of about 0.42 from 0.65.

The chemical flood began with the injection of a 0.3 pore volume slug of 1500 ppm FPS samples (FPS-1a, 1b, 1c, 2a, 2b, 2c in 6 separated coreflood tests) prepared with 0.5% NaCl brine, followed by 0.5% NaCl brine to irreducible oil saturation (watercut 98%). The resulting residue oil saturation is listed in the table 3.

A separated chemical flood began with the injection of a 0.3 pore volume slug of 1500 ppm PAM-25 (polyacrylamide, hydrolysis degree=23%, molecular weight 25 million) prepared with 0.5% NaCl brine, followed by 0.5% NaCl brine to irreducible oil saturation (watercut 98%) (See Table 3).

TABLE 3

|  | FPS-1a | FPS-1b | FPS-1c | FPS-2a | FPS-2b | FPS-2c | PAM-25 |
|---|---|---|---|---|---|---|---|
| Saturation | 0.30 | 0.35 | 0.32 | 0.27 | 0.29 | 0.30 | 0.38 |

The resulting irreducible oil saturation data Table 3 indicate that the FPS, generally speaking at lower molecular weight, has better oil recovery performance than the ultra high molecular weight polyacrylamide. The FPS-2b was used in the 100% watercut mature field trial (113 F, 0.3-0.4% salinity, onshore sandstone, irreducible oil saturation after waterflood), and recovered more than incremental 9.5% of original oil in place.

Example 4

Two coreflood tests were carried out at 113 F in epoxy-coated Berea sandstone 12 inch medium permeability cores. The dry core was preflushed with 2 pore volumes of brine before it was flooded to an irreducible water saturation with a typical Daqing crude oil. The core was then waterflooded with 0.3% salinity brine to irreducible oil saturation (watercut 98%). Wherein, the accumulated recovery of core 1, after the water flood, was 46% of original oil saturation, and the accumulated recovery of core 2, after the water flood, was 47% of original oil saturation.

In the core 1, a FPS-2c solution (about 0.5 million molecular weight, 7.3 cP, 0.6 pore volume) was injected to obtain incremental 17% of original oil saturation.

In the core 2, a PAM-15 solution (regular polyacrylamide, about 15 million molecular weight, 20.6 cP, 0.6 pore volume) was injected to obtain incremental 10% of original oil saturation.

The FPS-2c, with about one-third of the viscosity of PAM-15, had 70% more oil recovery performance.

Example 5

Two coreflood tests were carried out at 113 F in epoxy-coated Berea sandstone 6 inch low permeability (50-80 md) cores. The dry core was preflushed with 2 pore volumes of brine before it was flooded to an irreducible water saturation with a typical Daqing crude oil. The core was then waterflooded with 0.3% salinity brine to irreducible oil saturation (watercut 98%).

A 100 ppm FPS-2b in 0.3% NaCl brine was injected (0.3 pore volume) to obtain incremental 10% of original oil saturation. It demonstrated the uncommon oil recovery ability of FPS-2b even at the low concentration.

It will be understood that particular embodiments described herein are shown by way of illustration and not as limitation of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention.

What is claimed is:

1. A functional polymeric surfactant, comprising:

a) a first repeating monomer unit having a first formula of

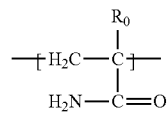

b) a second repeating monomer unit having a second formula of

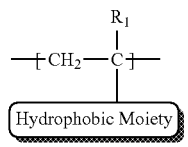

c) a third repeating monomer unit having a third formula of

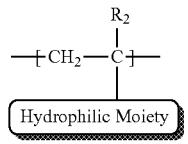

wherein $R_0$ and $R_2$ are hydrogen or $C_1$-$C_4$ alkyl;

wherein the hydrophilic moiety is hydrophilic and selected from the group consisting of anionic, cationic, nonionic, zwitterionic, betaine, and amphoteric ion pair;

wherein an oil phase-aqueous phase IFT value of the functional polymeric surfactant is from about 0.1 to about 15 dyne/cm;

wherein the content of the second repeating monomer unit is about 2% to about 15% in the functional polymeric surfactant;

wherein the second repeating monomer unit is selected from the group consisting of

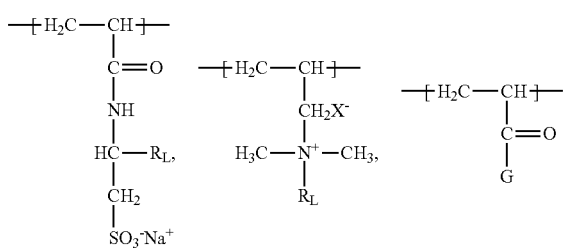

wherein $R_L$ is an alkyl, phenyl or derivatives of the alkyl or phenyl; and $X^-$ is $Cl^-$ or $Br^-$, $Ac^-$, $NO_3^-$, or $\frac{1}{2}SO_4^{2-}$, and G represents a bis-ammonium Gemini surfactant moiety.

2. The functional polymeric surfactant of claim 1, wherein the second repeating monomer unit is selected from the group consisting of

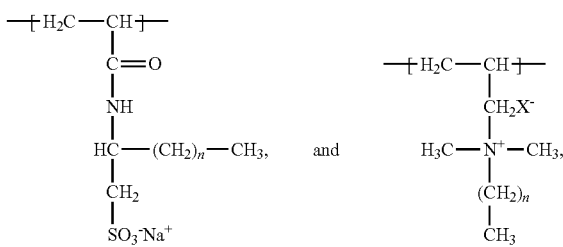

wherein n is an integer from 8 to 20 and $X^-=Cl^-$, $Br^-$, $Ac^-$, $NO_3^-$, or $\frac{1}{2}SO_4^{2-}$.

3. The functional polymeric surfactant of claim 2, wherein the third-repeating monomer unit is selected from the group consisting of

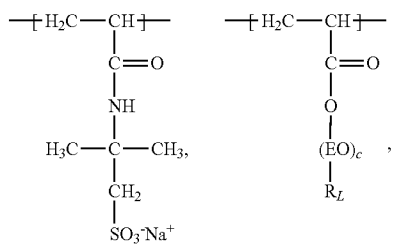

wherein $R_L$ is an alkyl, phenyl or derivates of the alkyl or phenyl; EO represents $-CH_2-CH_2-O-$, and c is an integer from 8 to 18.

4. The functional polymeric surfactant of claim 2, wherein the third repeating monomer unit is

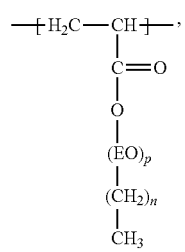

wherein n is an integer from 8 to 20; EO represents $-CH_2CH_2O-$, and p is an integer from 6-20.

5. A functional polymeric surfactant, comprising a polymeric reaction product of:

a) a first monomer having a first formula of

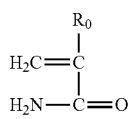

b) a hydrophobic monomer having a second formula of

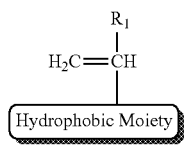

c) a hydrophilic monomer having a third formula of

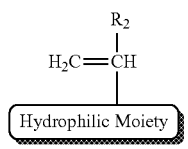

wherein $R_0$ and $R_2$ are hydrogen or $C_1$-$C_4$ alkyl;

wherein the hydrophilic moiety is hydrophilic and selected from the group consisting of anionic, cationic, nonionic, zwitterionic, betaine, and amphoteric ion pair;

wherein an oil phase-aqueous phase IFT value of the functional polymeric surfactant composition is from about 0.1 to about 15 dyne/cm;

wherein the content of the hydrophobic monomer having the second formula is about 2% to about 15% in the functional polymeric surfactant;

wherein the hydrophobic monomer is selected from the group consisting of

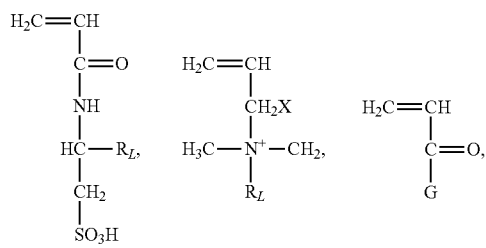

wherein $R_L$ is an alkyl, phenyl or derivatives of the alkyl or phenyl; and $X^-$ is $Cl^-$, or $Br^-$, $Ac^-$, $NO_3^-$, or $\frac{1}{2}SO_4^{2-}$, and G represents a bis-ammonium Gemini surfactant moiety.

6. The functional polymeric surfactant of claim 5 wherein the hydrophobic monomer is selected from the group consisting of

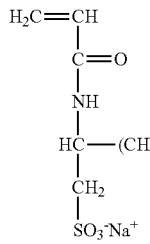 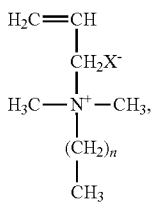

wherein n is an integer from 8 to 20 and $X^-=Cl^-$, $Br^-$, $Ac^-$, $NO_3^-$, or $\frac{1}{2}SO_4^{2-}$.

7. The functional polymeric surfactant of claim 5 wherein the hydrophilic monomer is selected from the group consisting of

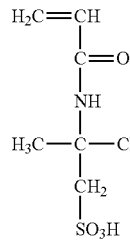 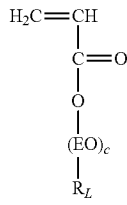

wherein $R_L$ is a an alkyl, phenyl or derivates of the alkyl or phenyl; EO represents $-CH_2-CH_2-O-$, and c is an integer from 8 to 18.

8. The functional polymeric surfactant of claim 5 wherein the hydrophilic monomer is selected from the group consisting of

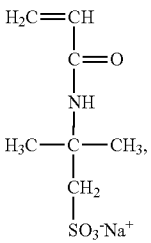 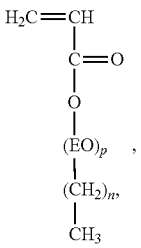

wherein n is an integer from 8 to 20; EO represents $-CH_2CH_2O-$, and p is an integer from 6-20.

* * * * *